(12) United States Patent
Dawes et al.

(10) Patent No.: US 11,401,197 B2
(45) Date of Patent: Aug. 2, 2022

(54) HALOGEN DOPED OPTICAL FIBERS

(71) Applicant: CORNING INCORPORATED, Corning, NY (US)

(72) Inventors: Steven Bruce Dawes, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 181 days.

(21) Appl. No.: 16/568,856

(22) Filed: Sep. 12, 2019

(65) Prior Publication Data
US 2020/0087195 A1    Mar. 19, 2020

Related U.S. Application Data

(60) Provisional application No. 62/733,226, filed on Sep. 19, 2018.

(51) Int. Cl.
*C03B 37/018* (2006.01)
*C03B 37/027* (2006.01)

(52) U.S. Cl.
CPC ........ *C03B 37/0183* (2013.01); *C03B 37/027* (2013.01); *C03B 2201/12* (2013.01); *C03B 2201/20* (2013.01); *C03B 2203/22* (2013.01)

(58) Field of Classification Search
None
See application file for complete search history.

(56) References Cited

U.S. PATENT DOCUMENTS

| | | | |
|---|---|---|---|
| 7,752,870 B1 | 7/2010 | Homa | |
| 9,618,692 B2 | 4/2017 | Berkey et al. | |
| 2011/0058780 A1 | 3/2011 | Han et al. | |
| 2016/0011365 A1* | 1/2016 | Berkey | C03B 37/01853 385/127 |
| 2016/0139333 A1* | 5/2016 | Zhang | G02B 6/02214 385/124 |
| 2017/0168231 A1 | 6/2017 | Berkey et al. | |
| 2017/0176673 A1* | 6/2017 | Berkey | C03B 37/025 |

FOREIGN PATENT DOCUMENTS

EP    2502887 A1    9/2012

OTHER PUBLICATIONS

Nikolin, "Silica glasses and optical fibers prepared by plasma chemical vapor deposition using bromide precursors", Inorganic Materials 39(8) Jan. 1, 2003, pp. 871-876.
International Search Report and Written Opinion of the European International Searching Authority; PCT/US2019/049406; dated Dec. 3, 2019; 13 Pgs.

* cited by examiner

*Primary Examiner* — Lisa L Herring
(74) *Attorney, Agent, or Firm* — Kevin L. Bray

(57) ABSTRACT

A method of forming an optical fiber preform includes: flowing a silicon halide and an oxidizer inside of a substrate tube, wherein a molar ratio of the silicon halide to the oxidizer is from about 1.5 to about 5.0; applying a plasma to the substrate tube to heat the substrate tube to a temperature of from about 1000° C. to about 1700° C.; and depositing silica glass comprising a halogen inside the substrate tube.

16 Claims, 8 Drawing Sheets

HALOGEN DOPED OPTICAL FIBERS

This application claims the benefit of priority to U.S. Provisional Application Ser. No. 62/733,226 filed on Sep. 19, 2018, the content of which is relied upon and incorporated herein by reference in its entirety.

FIELD OF THE DISCLOSURE

The present disclosure generally relates to optical fibers, and more specifically to optical fibers doped with halogen dopants.

BACKGROUND

Doping of a core region of a silica-based optical fiber with halogens has been used for lowering attenuation in optical fibers. Achieving sufficient doping levels to develop a well-guided waveguide may prove difficult. Conventional gaseous doping techniques may require high doping pressures to reach sufficient dopant concentrations in the preform. Such high pressures may necessitate the use of specialized equipment and lengthen the doping time, thereby increasing manufacturing cost and time. Conventional plasma chemical vapor deposition techniques of forming doped silica glass often utilize silicon and/or chlorine-bearing compounds in conjunction with oxygen. In such instances, the silicon or chlorine-bearing compound is the limiting reagent or reactant. Such plasma chemical vapor deposition techniques often do not reach sufficient halogen doping percentages within the glass to form a well-guided waveguide.

SUMMARY OF THE DISCLOSURE

According to at least one feature of the present disclosure, a method of forming an optical fiber preform includes: flowing a silicon halide and an oxidizer inside of a substrate tube, wherein a molar ratio of the silicon halide to the oxidizer is from 1.5 to 4.0; applying energy to form a plasma from the silicon halide and the oxidizer, the plasma heating an inside surface of the substrate tube to a temperature of from about 1000° C. to about 1700° C.; and depositing silica glass from a reaction of the silicon halide and the oxidizer on the inside surface of the substrate tube, the silica glass comprising a halogen.

According to another feature of the present disclosure, a method of forming an optical fiber preform includes: flowing a silicon halide and $O_2$ inside of a substrate tube, wherein a molar ratio of the silicon halide to $O_2$ is greater than 1.5; applying energy to form a plasma from the silicon halide and the oxidizer, the plasma heating an inside surface of the substrate tube to a temperature of from about 1000° C. to about 1700° C.; and depositing silica glass from a reaction of the silicon halide and the $O_2$ on the inside surface of the substrate tube, wherein the silica glass comprises a halogen derived from the silicon halide at a concentration of about 2.0 wt % or greater.

According to another feature of the present disclosure, a method of forming an optical fiber includes: flowing a silicon halide and $O_2$ inside of a substrate tube, wherein a molar ratio of the silicon halide to the $O_2$ is 1.5 or greater, further wherein the pressure within the substrate tube is about 50 Torr or less; applying energy to form a plasma from the silicon halide and the $O_2$, the plasma heating an inside surface of the substrate tube to a temperature of from about 1000° C. to about 1400° C.; depositing silica glass from a reaction of the silicon halide and the $O_2$ on the inside surface of the substrate tube, wherein the silica glass comprises a halogen at a concentration of from about 2.0 wt % to about 7.0 wt %.

These and other features, advantages, and objects disclosed herein will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
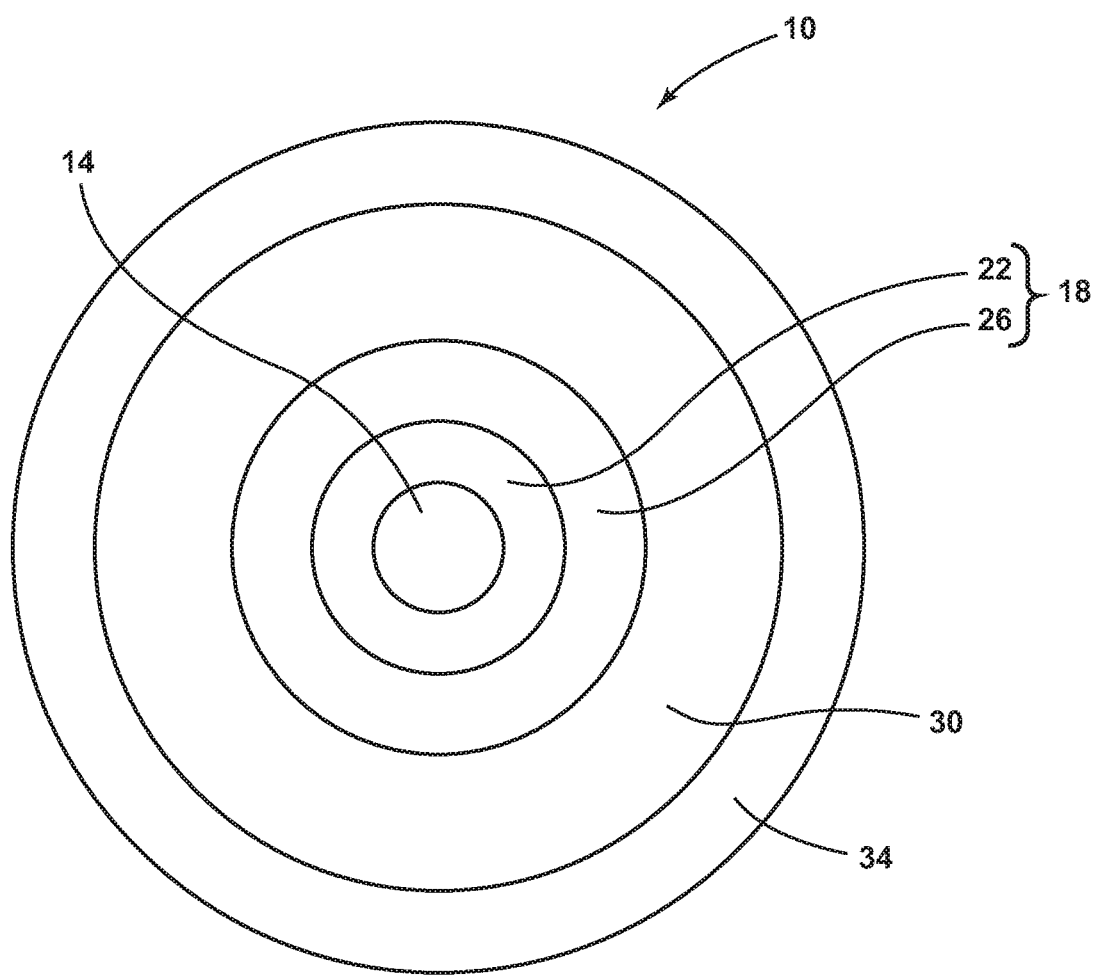
FIG. 1 is a schematic depiction of a cross-section of an optical fiber, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIG. 1, depicted is an optical fiber 10 having a core (or core region) 14 and a cladding (or cladding region) 18. The cladding 18 may include an inner cladding (or inner cladding region) 22 and an outer cladding (or outer cladding region) 26, but it will be understood that the cladding 18 may be a single, substantially homogenous, layer. According to various examples, the optical fiber 10 may include a primary coating 30 and a secondary coating 34 positioned around the cladding 18. As is known in the art, effective waveguiding requires that the refractive index averaged over core 14 be greater than the refractive index averaged over cladding 18.

The core 14 and the cladding 18 may substantially include $SiO_2$ in the form of silica glass. According to various examples, the core 14 may also include dopants configured to increase or decrease the refractive index of the core 14 relative to undoped $SiO_2$. Exemplary halogen dopants of the core 14 include F, Cl, Br and I. Table 1 provides a list of the impact on the relative refractive index (%) per weight percent (wt %) dopant for a variety of halogens as compared to undoped $SiO_2$.

TABLE 1

| Dopant | Impact on Relative Refractive Index (%) per wt % dopant |
|---|---|
| F | −0.3 |
| Cl | 0.065 |
| Br | 0.105 | where relative refractive index (%) (also referred to as relative refractive index, Δ, or Δ%) is given by:

$$\Delta\ \% = 100\frac{n^2(r) - n_{SiO_2}^2}{2n^2(r)}$$

where n(r) is the refractive index of the fiber at the radial distance r from the fiber centerline (r=0) at a wavelength of 1550 nm, unless otherwise specified, and $n_{SiO2}$ is the index of undoped silica at a wavelength of 1550 nm.

Chlorine (Cl), as a dopant in the core 14, generally increases the relative refractive index and may have a low effect on Rayleigh scattering due to the relatively small size of the Cl atoms. However, as Cl has a relatively low impact on the relative refractive index, a relatively large wt % of Cl may be necessary to sufficiently increase the refractive index of the core 14 such that the optical fiber 10 may be a well-guided waveguide. Larger atomic weight halogen dopants such as Br (bromine) and I (iodine) have a greater impact on the relative refractive index of the core 14 and as such can have a greater impact on the refractive index in lower quantities.

The halogen weight percent of any of the halogen dopants individually (i.e., any one of F, Cl, Br and I) in the core 14 may be about 0.2 wt %, or about 0.4 wt %, or about 0.6 wt %, or about 0.8 wt %, or about 1.0 wt %, or about 1.2 wt %, or about 1.4 wt %, or about 1.6 wt %, or about 1.8 wt %, or about 2.0 wt %, or about 2.2 wt %, or about 2.4 wt %, or about 2.6 wt %, or about 2.8 wt %, or about 3.0 wt %, or about 3.2 wt %, or about 3.4 wt %, or about 3.6 wt %, or about 3.8 wt %, or about 4.0 wt %, or about 4.2 wt %, or about 4.4 wt %, or about 4.6 wt %, or about 4.8 wt %, or about 5.0 wt %, or about 5.2 wt %, or about 5.4 wt %, or about 5.6 wt %, or about 5.8 wt %, or about 6.0 wt % or any and all values and ranges therebetween. For example, the halogen weight percent in the core 14 of any of F, Cl, Br or I may be about 2 wt % or greater, or 3 wt % or greater, or about 4 wt % or greater, or from about 0.1 wt % to about 6.0 wt %, or from about 0.5 wt % to about 5.0 wt %, or from about 1.0 wt % to about 5.0 wt %, or from about 1.5 wt % to about 5.0 wt %, or from about 1.75 wt % to about 5.0 wt %, or from about 2 wt % to about 5 wt %. In some embodiments, core 14 includes two or more halogen dopants, each of which has a halogen weight percent as indicated above.

The cladding 18 may be undoped silica or may be silica doped with one or more halogen dopants. For example, both the inner cladding 22 and the outer cladding 26 may be undoped silica. In another example, the inner cladding 22 may include a halogen dopant and the outer cladding 26 may be undoped silica. In another example, the inner cladding 22 may be undoped silica and the outer cladding 26 may include a halogen dopant. In yet another example, both the inner cladding 22 and outer cladding 26 may include a halogen dopant.

The cladding 18 may include an up-dopant and/or a down-dopant. For example, the inner cladding 22 and/or the outer cladding 26 may be doped with F. The doping concentration of F in the inner cladding 22 and/or the outer cladding 26 may be in a range from about 0.01 wt % to about 2.0 wt %, or from about 0.01 wt % to about 1.5 wt %, or from about 0.01 wt % to about 1.0 wt %, or from about 0.01 wt % to about 0.80 wt %, or from about 0.05 wt % to about 0.50 wt %, or from about 0.05 wt % to about 0.4 wt %, or from about 0.05 wt % to about 0.25 wt %. According to various examples, the inner cladding 22 and/or outer cladding 26 may be doped with an up-dopant. For example, the inner cladding 22 and/or the outer cladding 26 may be doped with an up-dopant (e.g., Cl, Br, I, and/or Ge) to a concentration of from about 0.01 wt % to about 3.0 wt %, or from about 0.01 wt % to about 2.5 wt %, or from about 0.01 wt % to about 2.0 wt %, or from about 0.01 wt % to about 1.5 wt %, or from about 0.01 wt % to about 1.0 wt %, or from about 0.01 wt % to about 0.05 wt %.

According to various examples, the core 14 of the optical fiber 10 can be optimized for low attenuation performance in both single and few-mode configurations by limiting the $GeO_2$, $K_2O$ and/or $TiO_2$ content in the fiber 10. Further, the minimizing or elimination of Ge, K and Ti in the core 14 can improve the attenuation performance of the optical fiber 10 by reducing the effects of Rayleigh scattering. For example, the core 14 may contain about 1.0 wt % or less, or about 0.5 wt % or less, or about 0.1 wt % or less, or about 0.0 wt % of $GeO_2$, $K_2O$, or $TiO_2$, alone or in combination. In some embodiments, the core is free of $GeO_2$, $K_2O$ or $TiO_2$.

The optical fiber 10 may have an attenuation at 1550 nm of less than about 0.180 dB/km, or less than about 0.175 dB/km, or less than about 0.170 dB/km, or less than about 0.165 dB/km, or less than about 0.160 dB/km, or less than about 0.155 dB/km. The optical fiber 10 employing the co-doped core 14 may have an attenuation at 1330 nm of less than about 0.325 dB/km, or less than about 0.320 dB/km, or less than about 0.315 dB/km, or less than about 0.310 dB/km, or less than about 0.305 dB/km.

Figure 2:
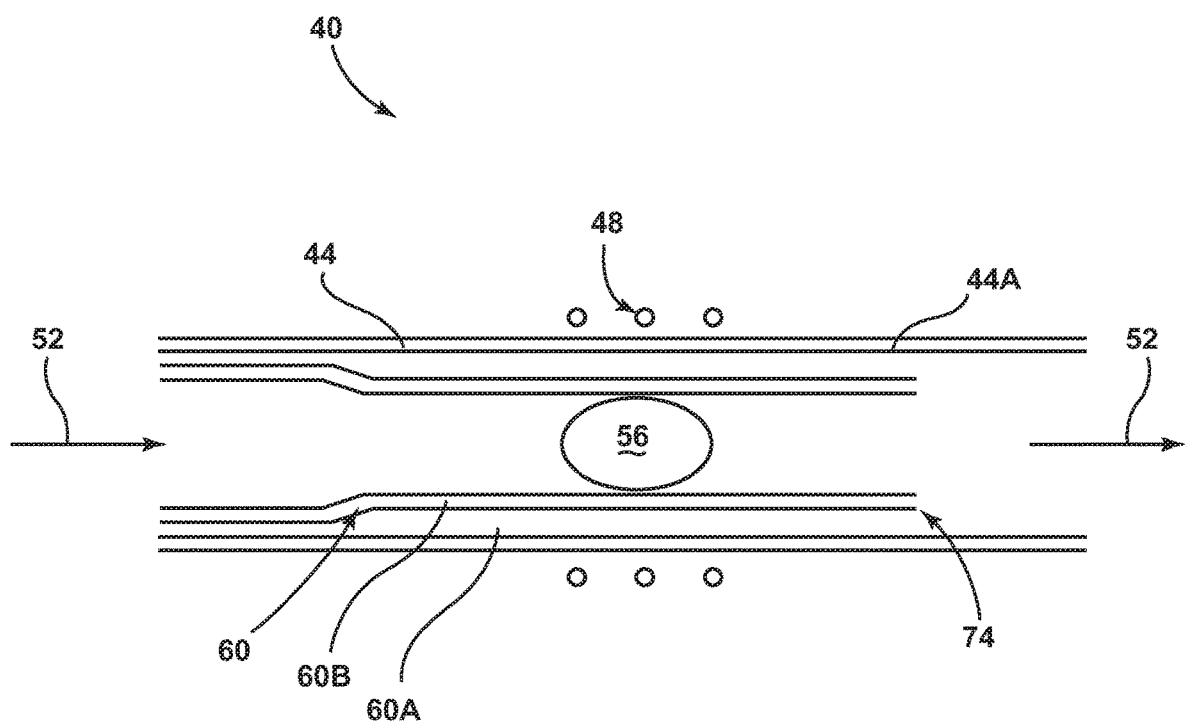
FIG. 2 shows a schematic view of a plasma chemical vapor deposition apparatus for forming an optical fiber preform, according to at least one example.

Referring now to FIG. 2, depicted is a schematic diagram of a PCVD assembly 40 for making an optical fiber preform. As shown in FIG. 2, a substrate tube 44 is positioned in a radio frequency coil 48 or another suitable plasma excitation source. It will be understood that a heat source (e.g., a furnace) may be used in conjunction with the radio frequency coil 48 to initially heat the substrate tube 44. The substrate tube 44 may include silica glass or silica glass including a dopant for adjusting the index of refraction of the silica glass. The dopant may include germania, phosphorous, aluminum, ytterbium, erbium, fluorine, or other conventional dopant materials as are known in the art or subsequently developed. The substrate tube 44 may be rotated in the radio frequency coil 48 as the radio frequency coil 48 traverses the length of the substrate tube 44. As will be explained in greater detail below, a gaseous mixture 52 may be flowed into the substrate tube 44 and into a plasma 56 generated by the radio frequency coil 48. By flowing the gaseous mixture 52 into the plasma 56, components of the gaseous mixture 52 may react to form a silica glass 60 within the substrate tube 44.

Figure 3:
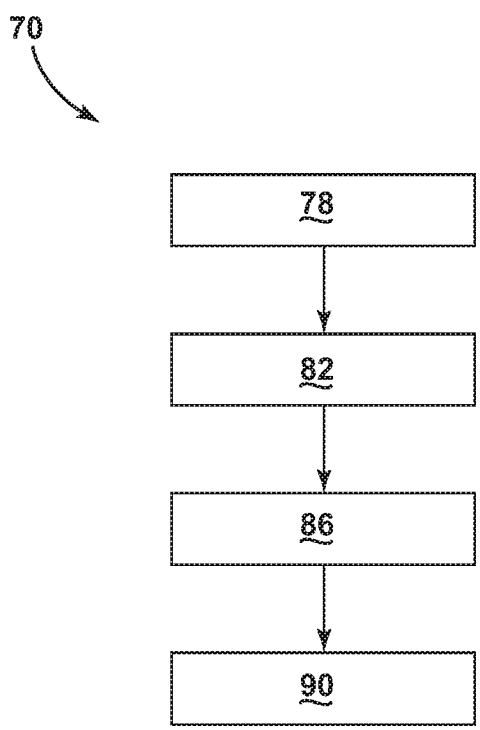
FIG. 3 is a flowchart of a method, according to at least one example.

Referring now to FIGS. 2 and 3, the PCVD assembly 40 may be utilized in a method 70 of forming an optical fiber preform 74. The method 70 may begin with a step 78 of flowing the gaseous mixture 52 inside of the substrate tube 44. The gaseous mixture 52 may include a silicon halide, an oxidizer and one or more other gases. As such, step 78 may include flowing a silicon halide and an oxidizer inside of the substrate tube 44. The silicon halide may be any compound which includes both silicon and a halogen. The silicon halide may have the general chemical formula of $SiX_4$, $SiH_nX_{4-n}$ or $Si_nX_{2+2}$, wherein X is one of F, Cl, Br, I and At. It will be understood that the silicon halide may be a mixed silicon halide in that X may be two or more of the above-noted elements. Specific examples of silicon halides may include $SiF_4$, $SiHF_3$, $SiH_2F_2$, $SiCl_2F_2$, $SiCl_4$, $SiHCl_3$, $SiH_2Cl_2$, $SiCl_2Br_2$, $SiBr_4$, $SiHBr_3$, $SiH_2Br_2$, $SiI_2Br_2$, $SiI_4$, $SiF_4$, $SiHI_3$, $SiH_2I_2$, $Si_2Cl_6$, other silicon halides and/or combinations thereof. As such, the silicon halide may include iodine, bromine, chlorine, fluorine and/or combinations thereof. According to various examples, the silicon halide may be in vapor form in the gaseous mixture 52 as it flows in the substrate tube 44. As used herein, the term "vapor form" refers to a substance in the gas phase at a temperature lower than its critical temperature and as such can be condensed to a liquid by increasing the pressure on it without reducing the temperature.

According to various examples, the gaseous mixture 52 may include one or more oxidizers configured to react with the silicon halide. The oxidizer of the gaseous mixture 52 may include $O_2$, $H_2O$, $N_2O$, other oxidizers and/or combinations thereof. The oxidizer may be in a vapor form and/or in a gaseous form.

According to various examples, the gaseous mixture 52 (i.e., the silicon halide, the oxidizer, and optionally other gases) may flow into the substrate tube 44 at a pressure lower than atmospheric pressure. In some embodiments, the total pressure of gaseous mixture 52 within the substrate tube 44 may be about 50 Torr or less, or about 45 Torr or less, or about 40 Torr or less, or about 35 Torr or less, or 30 Torr or less, or about 25 Torr or less, or 20 Torr or less, or about 15 Torr or less, or 10 Torr or less, or about 5 Torr or less or any and all values and ranges between the given values. For example, the pressure of the gaseous mixture 52 within the substrate tube 44 may be from about 1 Torr to about 50 Torr, or from about 5 Torr to about 45 Torr, or from about 10 Torr to about 40 Torr, or from about 15 Torr to about 35 Torr, or from about 20 Torr to about 30 Torr. Use of the relatively low pressure of the gaseous mixture 52 outlined herein may allow the silicon halide to remain as a vapor which may be advantageous in producing the silica glass 60 as outlined in greater detail below.

In other embodiments, the combined partial pressures of the silicon halide and oxidizer in the gaseous mixture 52 within the substrate tube 44 may be about 50 Torr or less, or about 45 Torr or less, or about 40 Torr or less, or about 35 Torr or less, or 30 Torr or less, or about 25 Torr or less, or 20 Torr or less, or about 15 Torr or less, or 10 Torr or less, or about 5 Torr or less or any and all values and ranges between the given values. For example, the combined partial pressures of the silicon halide and oxidizer in the gaseous mixture 52 within the substrate tube 44 may be from about 1 Torr to about 50 Torr, or from about 5 Torr to about 45 Torr, or from about 10 Torr to about 40 Torr, or from about 15 Torr to about 35 Torr, or from about 20 Torr to about 30 Torr. Use of the relatively low combined partial pressures of the silicon halide and oxidizer within the substrate tube 44 outlined herein may allow the silicon halide to remain as a vapor which may be advantageous in producing the silica glass 60 as outlined in greater detail below.

In still other embodiments, the partial pressure of the silicon halide in the gaseous mixture 52 within the substrate tube 44 may be about 50 Torr or less, or about 45 Torr or less, or about 40 Torr or less, or about 35 Torr or less, or 30 Torr or less, or about 25 Torr or less, or 20 Torr or less, or about 15 Torr or less, or 10 Torr or less, or about 5 Torr or less or any and all values and ranges between the given values. For example, the partial pressure of the silicon halide in the gaseous mixture 52 within the substrate tube 44 may be from about 1 Torr to about 50 Torr, or from about 5 Torr to about 45 Torr, or from about 10 Torr to about 40 Torr, or from about 15 Torr to about 35 Torr, or from about 20 Torr to about 30 Torr. Use of the relatively low partial pressure of the silicon halide within the substrate tube 44 outlined herein may allow the silicon halide to remain as a vapor which may be advantageous in producing the silica glass 60 as outlined in greater detail below.

As explained above, the gaseous mixture 52 includes both the silicon halide and the oxidizer, and optionally other gases. The molar ratio of the silicon halide to the oxidizer in the gaseous mixture 52 may be calculated by dividing the molar flow rate of the silicon halide by the molar flow rate of the oxidizer. The molar ratio of the silicon halide to oxidizer in the gaseous mixture 52 may be about 0.5 or greater, or about 0.6 or greater, or about 0.7 or greater, or about 0.8 or greater, or about 0.9 or greater, or about 1.0 or greater, or about 1.1 or greater, or about 1.2 or greater, or about 1.4 or greater, or about 1.6 or greater, or about 1.8 or greater, or about 2.0 or greater, or about 2.2 or greater, or about 2.4 or greater, or about 2.6 or greater, or about 2.8 or greater, or about 3.0 or greater, or about 3.2 or greater, or about 3.4 or greater, or about 3.6 or greater, or about 3.8 or greater, or about 4.0 or greater, or about 4.2 or greater, or about 4.4 or greater, or about 4.6 or greater, or about 4.8 or greater, or about 5.0 or greater or any and all values and ranges between the given values. For example, the molar ratio of silicon halide to oxidizer in the gaseous mixture 52 may be from about 0.5 to about 5, or from about 0.8 to about 5.0, or from about 0.8 to about 4.0, or from about 1.0 to about 4.0, or from about 1.5 to about 4.0, or from about 2.0 to about 3.0. As such, the relative molar amount of the silicon halide may be greater than the oxidizer such that the silicon halide may function as a carrier gas in which the oxidizer is carried.

In a preferred embodiment, the oxidizer is the rate-limiting reagent in the reaction between the silicon halide and the oxidizer. While not wishing to be bound by theory, it is believed that when the oxidizer is the rate-limiting reagent, higher doping concentrations of halide in silica glass result. Higher molar ratios of the silicon halide to the oxidizer are more likely to make the oxidizer the rate-limiting reagent. In particular, molar ratios of silicon halide to oxidizer that are about 1.5 or greater are preferred (e.g. a molar ratio from about 1.5 to about 4.0).

According to various examples, the gaseous mixture 52 may include one or more other gases in the gaseous mixture 52 passing through the substrate tube 44. For example, the gaseous mixture 52 may include one or more silica-forming agents. Silica-forming agents are compounds configured to produce silica when ignited, burned or otherwise reacted with oxygen. Exemplary silica-forming agents may include octamethyltetracyclosiloxane, hexamethyldisiloxane, other silicon-bearing compounds and/or combinations thereof. The addition of one or more silica-forming agents in the gaseous mixture 52 may be advantageous in increasing the deposition rate of the silica glass 60. Further, the gaseous mixture 52 may include one or more diluent gases. Diluent gases may be gases which act to dilute the gaseous mixture 52 while being inert to the silicon halide and the oxidizer at the elevated temperatures produced by the plasma 56. Exemplary diluent gases may include He, Ar, $N_2$, Kr, Xe, $CO_2$, other diluent gases and/or combinations thereof. The volume percent of the diluent gas within the gaseous mixture 52 may be about 10%, or about 20%, or about 30%, or about 40%, or about 50%, or about 60%, or about 70%, or about 80%, or about 90% or any and all values and ranges therebetween.

It will be understood that the composition of the gaseous mixture 52 may be altered during operation of the PCVD assembly 40. For example, the PCVD assembly 40 may have a first composition of the gaseous mixture 52 passed therethrough which may form the portion of the preform having the composition of cladding 18 (FIG. 1) and a second composition of the gaseous mixture 52 passed therethrough to form the portion of the preform having the composition of core 14 (FIG. 1). It is further understood that the composition of the gaseous mixture 52 may also vary as it passes through substrate tube 44 due to reaction of a silicon halide and an oxidizer. As a result, the composition of gaseous mixture 52 exiting substrate tube 44 may differ from the composition of gaseous mixture 52 entering substrate tube 44.

Contemporaneously or after step 78, a step 82 of applying the plasma 56 to the substrate tube 44 to heat the substrate tube 44 is performed. As explained above, the radio frequency coils 48 may be used to generate the plasma 56 in and/or around the substrate tube 44 such that the plasma heats the substrate tube 44. To generate the plasma 56, power is applied to the radio frequency coil 48 to create the plasma 56 inside the substrate tube 44. In operation, the substrate tube 44 at a deposition zone of the silica glass 60 may be heated to a temperature of about 1000° C., or about 1050° C., or about 1100° C., or about 1150° C., or about 1200° C., or about 1250° C., or about 1300° C., or about 1350° C., or about 1400° C., or about 1450° C., or about 1500° C., or about 1550° C., or about 1600° C., or about 1650° C., or about 1700° C., or about 1750° C., or about 1800° C., or about 1850° C., or about 1900° C. or any and all values and ranges between the given values. For example, the plasma 56 may be applied to the substrate tube 44 to heat the substrate tube to a temperature of from about 1000° C. to about 1700° C., or from about 1100° C. to about 1700° C., or from about 1100° C. to about 1600° C., or from about 1100° C. to about 1400° C., or from about 1100° C. to about 1300° C., or from about 1100° C. to about 1200° C.

In operation of step 82, the plasma 56 causes the silicon halide and any other silicon-containing agents to react with the oxidizer thereby depositing silica glass 60 on an inside surface 44A of the substrate tube 44. The reaction of the silicon halide and the oxidizer inside the substrate tube 44 is dependent on the temperature and pressure inside the substrate tube 44 such that variations in the temperature and/or the pressure may change the characteristics of the silica glass 60 deposited in the substrate tube 44. The local temperature and pressure may be a function of the power of the plasma 56. A high plasma power results in high temperatures and low pressures of the gaseous mixture 52. The high plasma power conditions cause the $SiCl_4$ (i.e., the silicon halide) and $O_2$ (e.g., the oxidizer) react to form SiO vapors according to Eq. (1):

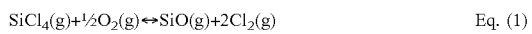

$$SiCl_4(g) + \tfrac{1}{2}O_2(g) \leftrightarrow SiO(g) + 2Cl_2(g) \qquad \text{Eq. (1)}$$

Contemporaneously or after step 82, a step 86 of depositing the silica glass 60 on the inside surface 44A, the substrate tube 44 is performed. At higher temperatures and lower pressures, the SiO vapors migrate to the inside surface 44A of the substrate tube 44 where the vapors undergo a heterogeneous reaction to form $SiO_2$ (silica) glass 60 directly on the inside surface 44A of the substrate tube 44 as a solid. The silica glass 60 is deposited on the inside surface 44A of the substrate tube 44 as a result of Eq. (2):

$$SiO(g) + \tfrac{1}{2}O_2(g) \leftrightarrow SiO_2(s) \qquad \text{Eq. (2)}$$

The silica glass 60 is directly deposited on the inside surface 44A of the substrate tube 44 via the heterogeneous reaction is dense, substantially void-free glass. Substantially void-free, as used herein, means that the deposited silica glass 60 contains an insignificant or incidental amount of air or other gas-filled voids such that the index of refraction of the deposited silica glass 60 is not altered by the presence of the incidental voids. The above-noted equations hold true regardless of the molar ratio of the silicon halide to oxidizer ratio. In examples where the silicon halide to oxidizer ratio approaches 1 or greater, the halogen of the silicon halide may begin to dope, or be present within, the silica glass 60 forming on the substrate tube 44 according to Eq. (3):

$$3SiO_2 + SiCl_4 \leftrightarrow 4SiO_{1.5}Cl \qquad \text{Eq. (3)}$$

As demonstrated by Eq. (3), in examples of the gaseous mixture 52 where an excess amount of $SiCl_4$ is present in the gaseous mixture 52, the $SiCl_4$ reacts with the silica glass 60 such that the halogen of the silicon halide enters the silica glass 60 deposited on the inside surface 44A of the substrate tube 44 as a dopant. Such doping may occur until the halogen weight percent in the silica glass 60 may be the same or substantially the same as outlined above in connection with the core 14 or cladding 18.

It will be understood that while Eq. (1), Eq. (2) and Eq. (3) were shown using $SiCl_4$ as the silicon halide, Eq. (1), Eq. (2) and Eq. (3) will take place substantially similarly for other choices of the silicon halide provided above.

In examples where the gaseous mixture 52 is exposed to higher pressures and/or lower temperatures from the plasma 56, some, or even all, of the SiO vapors may condense and form $SiO_2$ (silica) glass particles suspended in the gaseous mixture 52 flowing through the substrate tube 44. The suspended particles are commonly referred to as silica glass soot or soot. As the gaseous mixture 52 flows through the substrate tube 44, the soot may be deposited on the inside surface 44A of the substrate tube 44. Because the soot is essentially composed of discrete silica glass particles, layers of deposited soot on the inside surface 44A of the tube 44 may include pores or voids between the discrete particles of silica glass. In such an example, the silicon halide present in the gaseous mixture 52 may dope or react with the soot as outlined above.

As explained above, in examples where the silicon halide to oxidizer ratio approaches 1 or greater, the halogen of the silicon halide may begin to dope, or be present within, the silica glass 60. The halogen present within the silica glass 60 is the halogen(s) present within the silicon halide of the gaseous mixture 52. As such, step 86 may include depositing silica glass 60 including a halogen on the inside surface 44A of the substrate tube 44. The silica glass 60 may include an individual halogen weight percent (i.e., any one of F, Cl, Br and I) in the silica glass 60 of about 0.2 wt %, or about 0.4 wt %, or about 0.6 wt %, or about 0.8 wt %, or about 1.0 wt %, or about 1.2 wt %, or about 1.4 wt %, or about 1.6 wt %, or about 1.8 wt %, or about 2.0 wt %, or about 2.2 wt %, or about 2.4 wt %, or about 2.6 wt %, or about 2.8 wt %, or about 3.0 wt %, or about 3.2 wt %, or about 3.4 wt %, or about 3.6 wt %, or about 3.8 wt %, or about 4.0 wt %, or about 4.2 wt %, or about 4.4 wt %, or about 4.6 wt %, or about 4.8 wt %, or about 5.0 wt %, or about 5.2 wt %, or about 5.4 wt %, or about 5.6 wt %, or about 5.8 wt %, or about 6.0 wt % or any and all values and ranges therebetween. For example, the halogen weight percent of any of F, Cl, Br or I may be about 2 wt % or greater, or 3 wt % or greater, or about 4 wt % or greater, or from about 1.0 wt % to about 7.0 wt %, or from about 1.5 wt % to about 6.0 wt %, or from about 2.0 wt % to about 5.5 wt %, or from about 2.5 wt % to about 5.0 wt %, or from about 3.0 wt % to about 5.0 wt %. According to various examples, because the deposited silica glass 60 may obtain sufficiently high halogen concentrations within the silica glass 60, the silica glass 60 may be substantially free of $GeO_2$.

As explained above, the composition of the gaseous mixture 52 may be changed during operation of the PCVD assembly 40 to change conditions within the substrate tube 44. For example, a first composition of the gaseous mixture 52 may have a silicon halide to oxidizer molar ratio (e.g., 0.8 or less) which tends to form undoped silica (or silica doped with halogen concentration of less than 0.5 wt %) as a first silica glass 60A. It will be understood that in such an example the silicon halide may be supplemented with or replaced with a silica-forming agent to form the first silica glass 60A. After a sufficient thickness of the first silica glass 60A is formed, the composition of the gaseous mixture 52 may be changed such that a second silica glass 60B which is doped with a halogen (i.e., from the silicon halide) is deposited on the first silica glass 60A. Such layering of the first and second silica glasses 60A and 60B may form the optical fiber preform 74.

Figure 4:
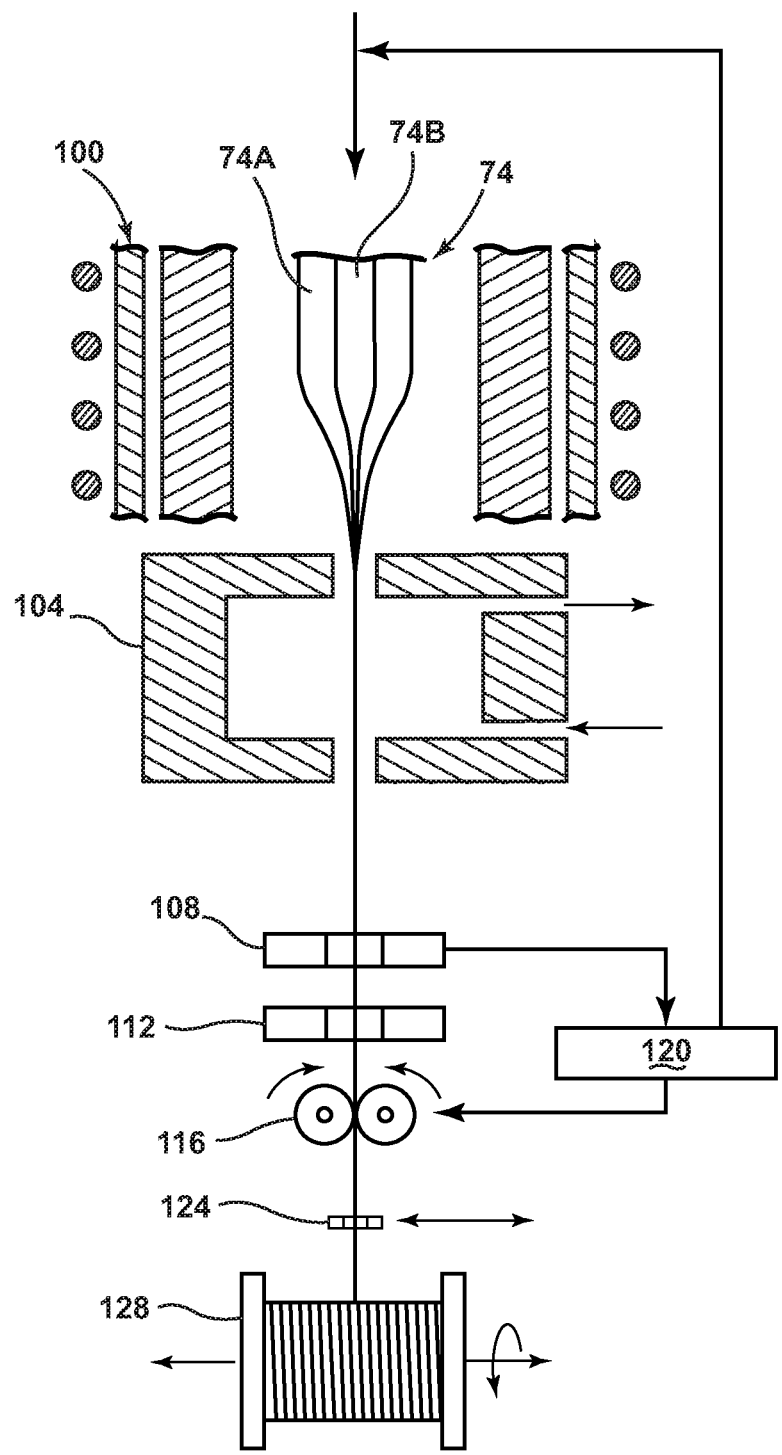
FIG. 4 is a schematic draw tower for drawing the optical fiber from an optical fiber preform, according to at least one example.

Referring now to FIGS. 3 and 4, the first silica glass 60A may form a cladding region 74A of the optical fiber preform 74 and the second silica glass 60B may form a core region 74B of the optical fiber preform 74. It will be understood that the core region 74B and the cladding region 74A of the optical fiber preform 74 may be formed in different runs of the method 70 or by different manufacturing techniques without departing from the teachings provided herein. Further, gaseous byproducts and excess gaseous mixture 52 passed through the PVCD assembly 40 may be expelled from the substrate tube 44 on an opposite end of the substrate tube 44 than where the gaseous mixture 52 entered. After the formation of the first silica glass 60A and the second silica glass 60B, the optical fiber preform 74 may undergo one or more redraw processes to form a void-free optical fiber preform 74.

Once the optical fiber preform 74 has been formed, a step 90 of drawing the optical fiber preform 74 into the optical fiber 10 may be performed. As the preform 74 is formed from the silica glass 60, step 90 may include drawing the silica glass 60 into the optical fiber 10. As shown in FIG. 4, the optical fiber preform 74 includes cladding region 74A and the core region 74B corresponding to the first silica glass 60A and the second silica glass 60B, respectively. Further, the cladding region 74A will be drawn to form the cladding 18 and the core region 74B will be drawn to form the core 14. The optical fiber preform 74 may be drawn into the optical fiber 10 by positioning the preform 74 within a draw furnace 100, and then heating and drawing the optical fiber 10 from the preform 74. The optical fiber 10 may then be cooled in a cooling chamber 104 and measured for final diameter with a non-contact sensor 108. One or more coatings (e.g., the primary coating 30 and/or secondary coating 34) may be applied and cured by a coating apparatus 112. During the draw, the optical fiber 10 passes through a tension assembly 116 whereby tension is applied to draw the optical fiber 10 from the preform 74. The tension is controlled via a control apparatus 120 to maintain the diameter of the optical fiber 10 at a predetermined set point. Finally, the coated optical fiber 10 is wound by a guide element 124 onto a fiber storage spool 128.

Use of the present disclosure may offer a variety of advantages. First, use of the presently disclosed method 70 offers the ability to form low loss optical fibers 10. Conventional manufacturing methods of forming doped waveguides suffer from the difficulty of placing sufficient quantities of dopants within the waveguide to achieve desired refractive index profiles. By utilizing molar ratios of silicon halide to oxidizer in the gaseous mixture 52 which result in the doping of the silica glass 60 according to Eq. (3), low loss optical fibers 10 may be achieved. For example, the core 14 of the optical fiber 10 may include about 1 wt % or greater of Br or about 2 wt % or greater of Cl resulting in an attenuation at 1550 nm of less than about 0.180 dB/km.

Second, use of the PCVD assembly 40 offers a precise control of halogen dopant concentrations in the core 14 and the cladding 18 of the optical fiber 10. Conventional doping techniques often utilize gaseous dopants diffused into monolithic soot bodies while the soot bodies are being consolidated. Such gaseous doping techniques may utilize high pressures which necessitates specialty equipment. In the present disclosure, the halogen dopant concentration and thickness of the core 14 and the cladding 18 can be precisely tailored as the silica glass 60 is deposited on the inside surface 44A of the substrate tube 44. Such a feature may be advantageous in allowing tight tolerance control over the core 14 and cladding 18.

Third, as the core 14 of the optical fiber 10 may be doped with relatively high quantities of F, Cl, Br and/or I to produce the necessary refractive index delta between the core 14 and the cladding 18, the optical fiber 10 may be substantially or wholly free of Ge. As explained above, use of Ge as an index-raising dopant for silica cores may tend to increase the Rayleigh scattering of the optical fiber 10 relative to undoped silica fibers. As such, the minimization or removal of Ge from the core 14 and replacing it with one or more halogen dopants may provide lower attenuation of the core 14 while providing a sufficient refractive index delta between the core 14 and the cladding 18 to produce a well-guided waveguide.

Fourth, as doping of the core 14 of the optical fiber 10 may achieve a sufficient relative refractive index delta, doping of the cladding 18 may not be necessary. Often, conventional fiber designs utilize dopants in the cladding to provide a necessary relative refractive index difference between the core and cladding. Such use of the doped cladding may add manufacturing complexity as well as cost. Use of the present disclosure may produce a sufficient weight percent of halogen dopants in the core 14 of the optical fiber 10 such that the cladding 18 may not need to be doped with one or more down-dopants to achieve an adequate difference in the relative refractive index between the core 14 and the cladding 18.

Fifth, use of the PCVD assembly 40 may eliminate conventional consolidation steps.

Conventional waveguides are often formed of compacted soot which may need to be sintered or consolidated to form a single vitreous body. Such consolidation may be both time and labor intensive, which may reduce production capacity and efficiency. Use of the presently disclosed PCVD assembly 40 deposits the silica glass 60 as a vitreous solid and as such does not need an additional consolidation step thereby eliminating manufacturing cost and complexity.

EXAMPLES

Provided below are non-limiting examples of the present disclosure.

Figure 5:
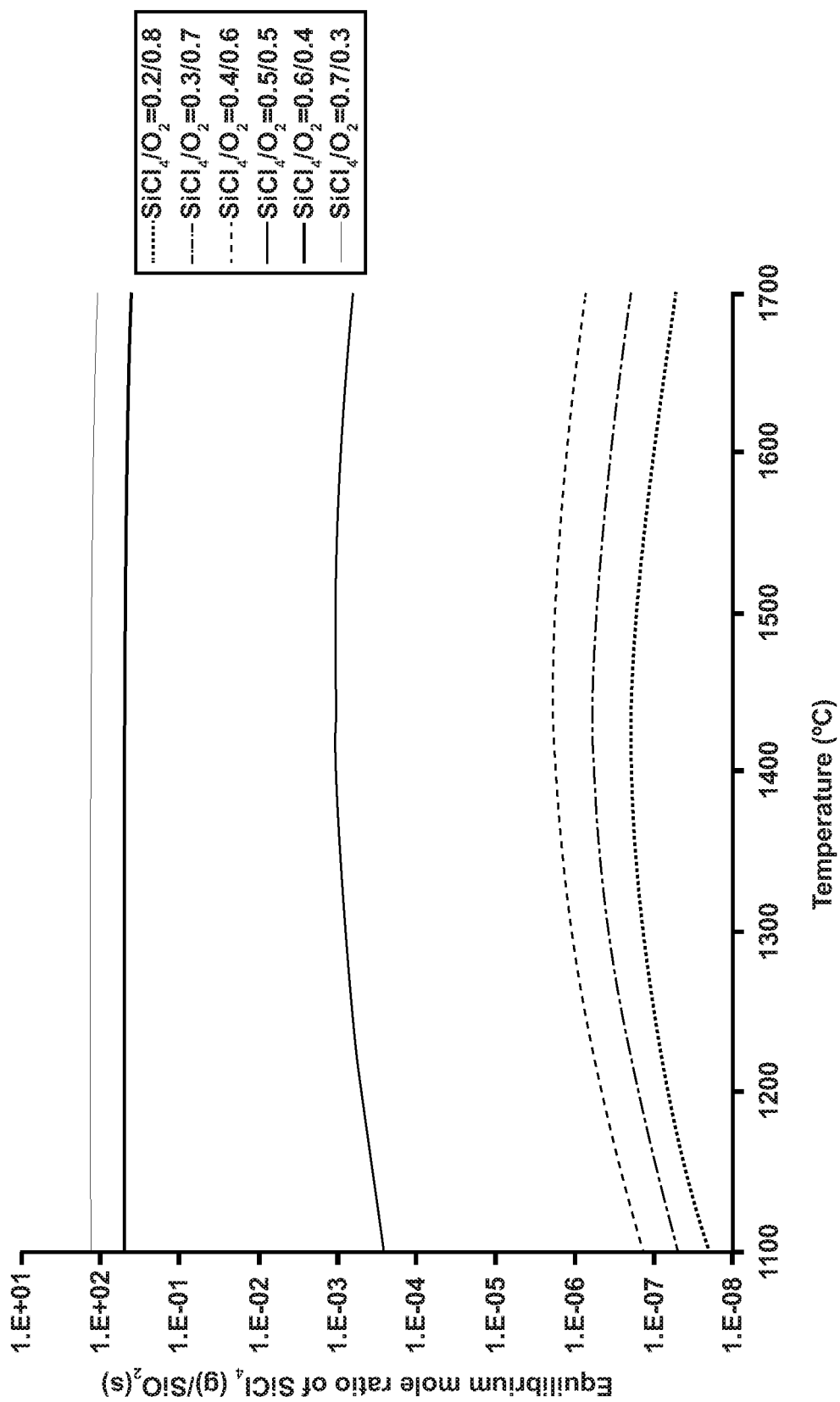
FIG. 5 is a plot of equilibrium mole ratio of $SiCl_4$ (gas)/$SiO_2$ (solid) vs. temperature for a variety of molar ratios of $SiCl_4$ to $O_2$.

Referring now to FIG. 5, an equilibrium mole (molar) ratio of a gas phase $SiCl_4$ (e.g., the silicon halide) and a solid $SiO_2$ phase (e.g., the silica glass 60) has been estimated by calculating the equilibrium concentrations for a range of temperatures (e.g. temperature of substrate surface 44A) at a designated pressure for a variety of $SiCl_4:O_2$ ratios (e.g., in the gaseous mixture 52). The calculations were done using Outokumpu HSC Chemistry® for Windows software (Outokumpu Research Oy, Finland), which uses the Gibbs free energy minimization technique for calculating equilibrium concentrations. The equilibrium mole ratio of $SiCl_4(g)/SiO_2(s)$ as a function of temperature at a pressure of 20 Torr for different input molar gas flow rate ratios of $SiCl_4(g)/O_2(g)$ is shown in FIG. 5. It is observed that the equilibrium mole ratio of $SiCl_4(g)/SiO_2(s)$ increases from about $1 \times 10^{-7}$ for an input gas flow rate ratio of $SiCl_4(g)/O_2(g)$ of 0.25 to about 2 for an input gas flow rate ratio of $SiCl_4(g)/O_2(g)$ of 2.33.

Figure 6:
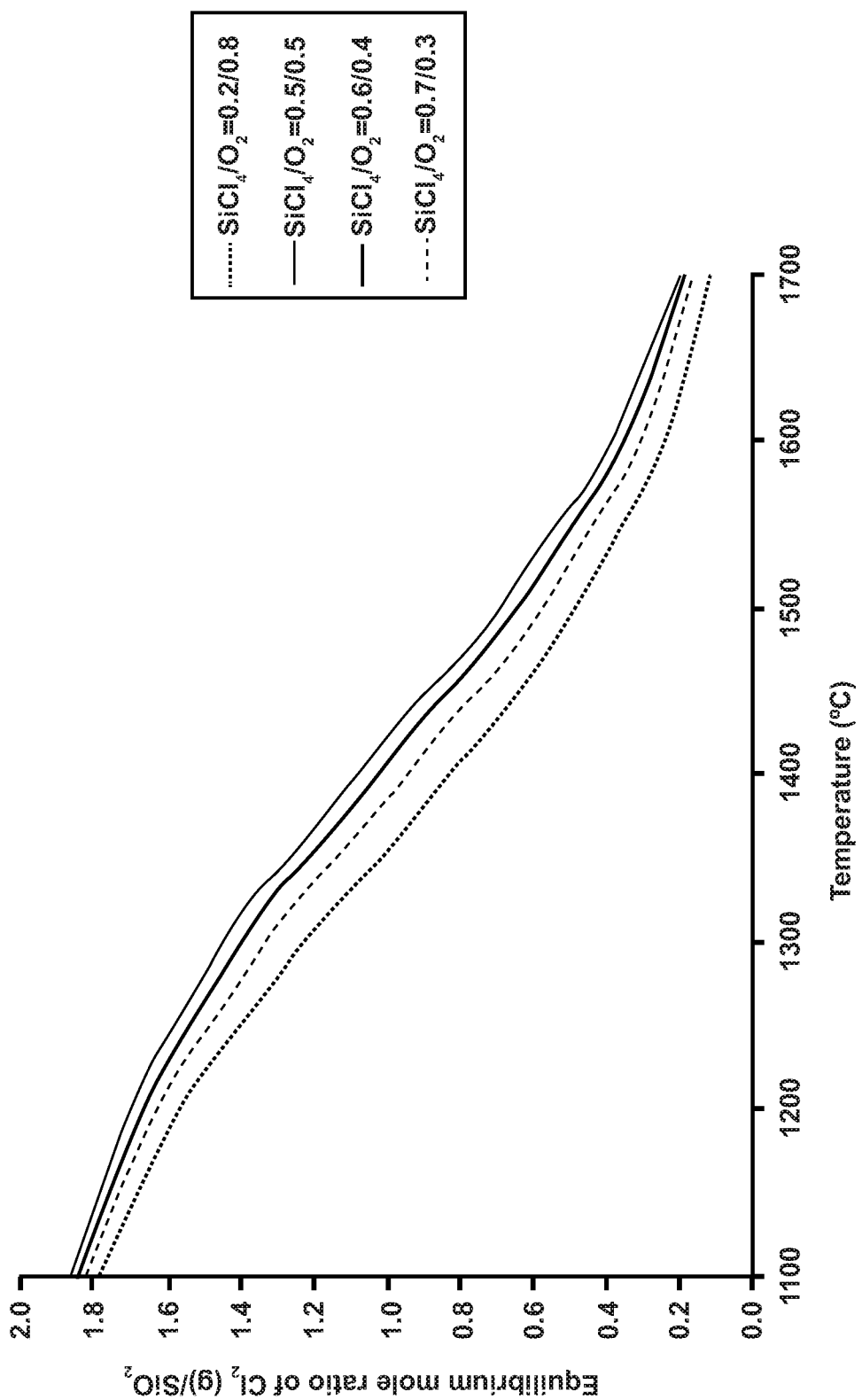
FIG. 6 is a plot of equilibrium mole ratio of $Cl_2$ (gas)/$SiO_2$ (solid) vs. temperature for a variety of molar ratios of $SiCl_4$ to $O_2$.

The corresponding equilibrium molar ratio of $Cl_2(g)/SiO_2(s)$ (gas phase $Cl_2$:solid phase $SiO_2$, where $Cl_2$ is a byproduct formed from $SiCl_4$) for different input $SiCl_4(g)/O_2(g)$ stoichiometry ratios at a pressure of 5 Torr is shown in FIG. 6. The $SiCl_4(g)$ and $Cl_2(g)$ are the species that chlorine dope the deposited layer (e.g., the silica glass 60). $SiCl_4$ (g) has a higher doping efficiency. As the input gas flow rate ratio of $SiCl_4(g)/O_2(g)$ is increased, it may negatively impact the deposition rate of the deposited layer. Consequently, in some examples, the PCVD deposition process (e.g., the method 70) is performed under conditions where the $SiCl_4/O_2$ molar ratio of input gas flow rates is about 4 or less.

Figure 7:
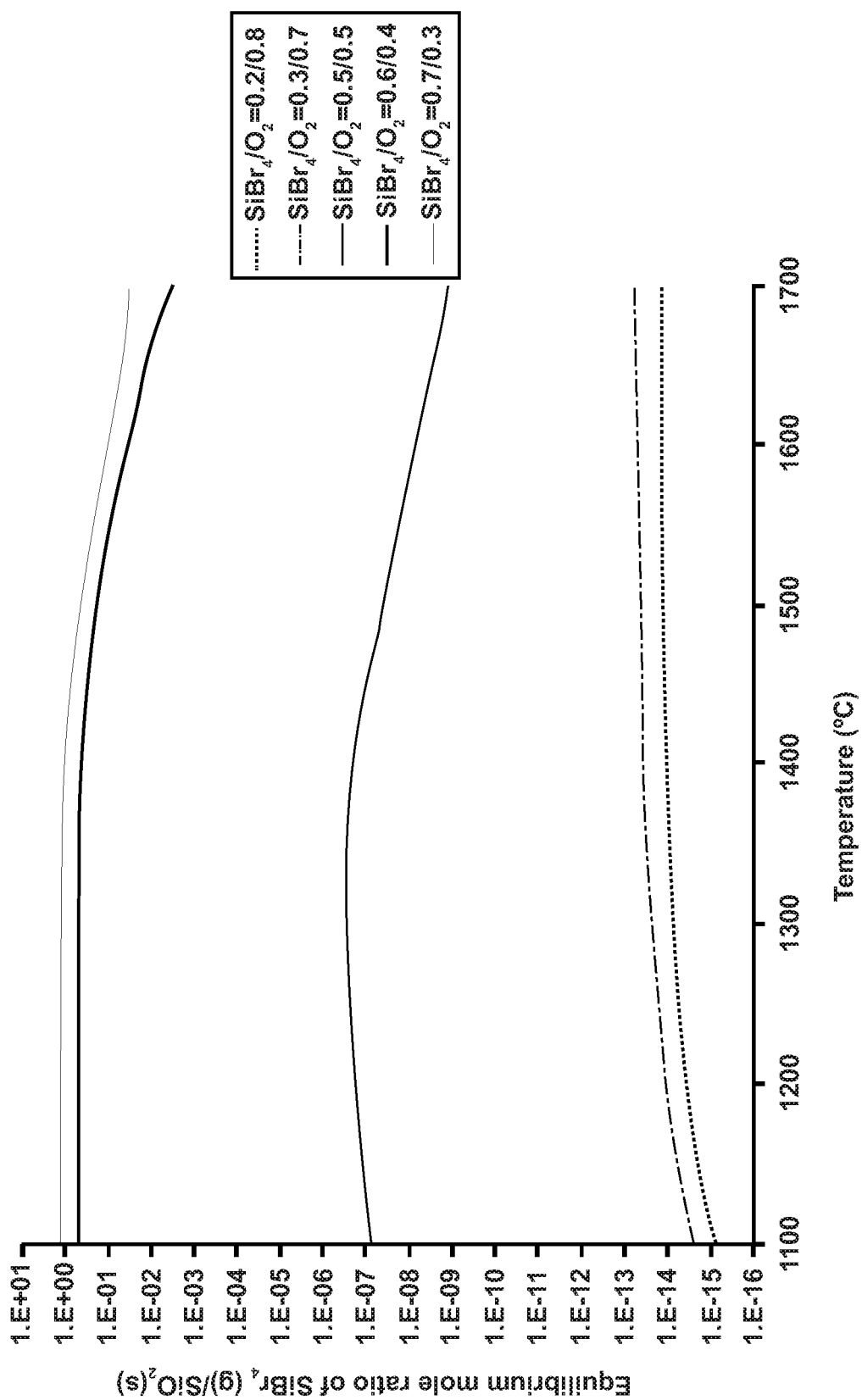
FIG. 7 is a plot of equilibrium mole ratio of $SiBr_4$ (gas)/$SiO_2$ (solid) vs. temperature for a variety of molar ratios of $SiBr_4$ to $O_2$.

The equilibrium mole ratio of $SiBr_4(g)/SiO_2(s)$ as a function of temperature at 20 Torr for different input gas flow rates of $SiBr_4(g)/O_2(g)$ is shown in FIG. 7. It is observed that the equilibrium mole ratio of $SiBr_4(g)/SiO_2(s)$ increases from $1 \times 10^{-14}$ for an input gas flow rate ratio of $SiBr_4(g)/O_2(g)$ of 0.25 to about 2 for an input gas flow rate ratio of $SiBr_4(g)/O_2(g)$ of 2.33.

Figure 8:
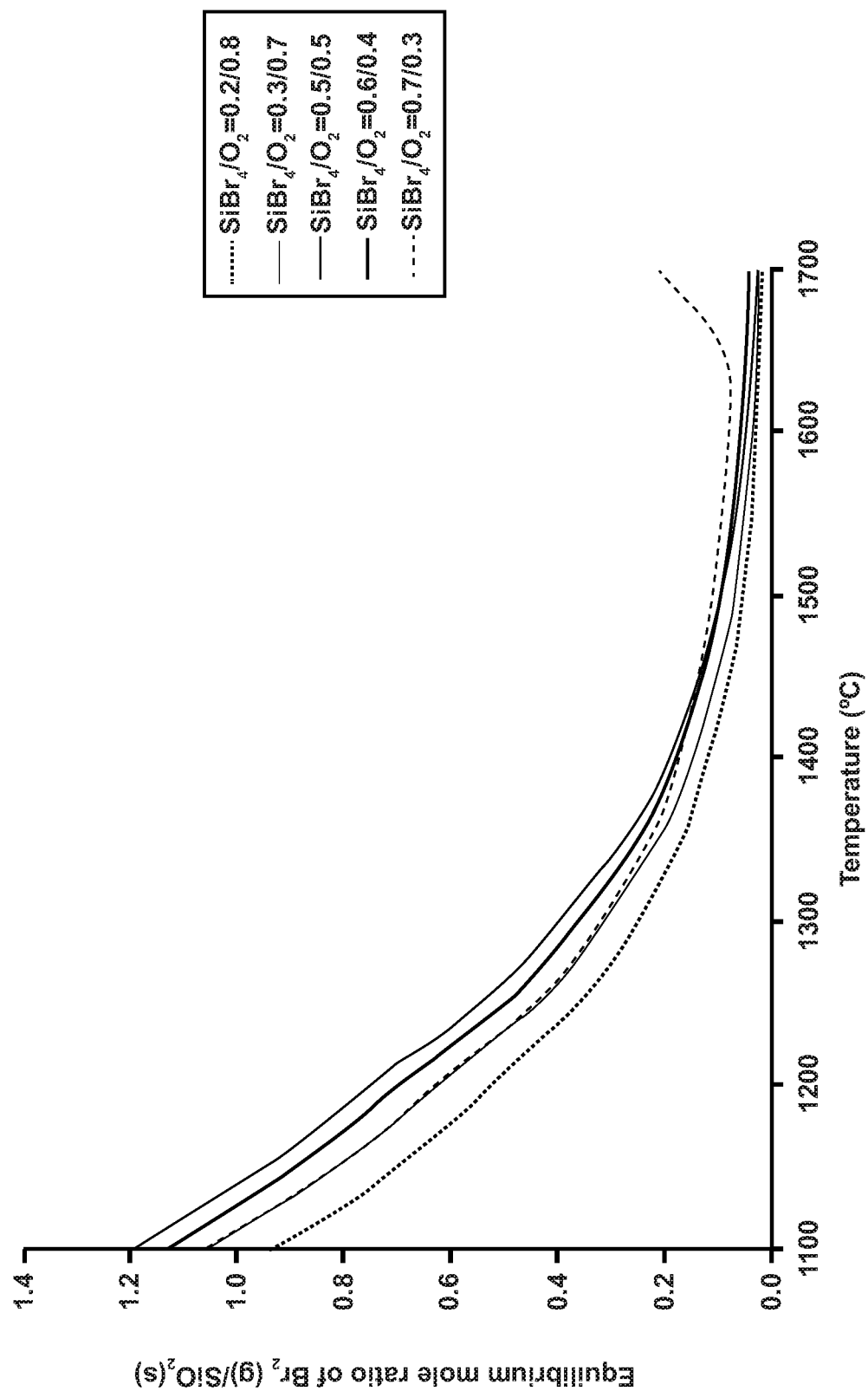
FIG. 8 is a plot of equilibrium mole ratio of $Br_2$ (gas)/$SiO_2$ (solid) vs. temperature for a variety of molar ratios of $SiBr_4$ to $O_2$.

The corresponding equilibrium moles of $Br_2(g)/SiO2$ for different input $SiBr_4(g)/O_2(g)$ stoichiometry ratios is shown in FIG. 8. The $SiBr_4(g)$ and $Br_2(g)$ are the species that bromine dope the deposited layer, with $SiBr_4$ (g) having higher doping efficiency. As the input gas flow rate ratio of $SiBr_4(g)/O_2(s)$ is increased, it may negatively impact the deposition rate. Consequently, in some examples, the PCVD deposition process is performed under conditions where the ratio of input gas flow rates of $SiBr_4/O_2$ is about 4 or less. For the case of bromine doping, the substrate temperature for performing PCVD process may be from about 1100° C. to about 1400° C., or from about 1100° C. to about 1300° C., or from about 1100° C. to about 1200° C. or any and all values therebetween.

Aspect 1 of the description is:
A method of forming an optical fiber preform, comprising:
flowing a silicon halide and an oxidizer inside of a substrate tube, wherein a molar ratio of the silicon halide to the oxidizer is from 1.5 to 4.0;
applying energy to form a plasma from the silicon halide and the oxidizer, the plasma heating an inside surface of the substrate tube to a temperature of from about 1000° C. to about 1700° C.; and
depositing silica glass from a reaction of the silicon halide and the oxidizer on the inside surface of the substrate tube, the silica glass comprising a halogen derived from the silicon halide.

Aspect 2 of the description is:
The method of Aspect 1, wherein the oxidizer comprises $O_2$.

Aspect 3 of the description is:
The method of either of Aspects 1 and 2, wherein the silicon halide comprises fluorine.

Aspect 4 of the description is:
The method of any of Aspects 1-3, wherein the silicon halide comprises bromine.

Aspect 5 of the description is:
The method of any of Aspects 1-4, wherein the silicon halide comprises chlorine.

Aspect 6 of the description is:
The method of any of Aspects 1-5, wherein the molar ratio of the silicon halide to the oxidizer is 2.0 or greater.

Aspect 7 of the description is:
The method of any of Aspects 1-5, wherein the molar ratio of the silicon halide to the oxidizer is 3.0 or greater.

Aspect 8 of the description is:
The method of any of Aspects 1-7, wherein the silica glass comprises a concentration of the halogen of about 2.0 wt % or greater.

Aspect 9 of the description is:
The method of any of Aspects 1-7, wherein the silica glass comprises a concentration of the halogen of about 3.0 wt % or greater.

Aspect 10 of the description is:
The method of any of Aspects 1-7, wherein the silica glass comprises a concentration of the halogen of about 4.0 wt % or greater.

Aspect 11 of the description is:
The method of any of Aspects 1-7, wherein the silica glass comprises a concentration of the halogen of from about 2.0 wt % to about 7.0 wt %.

Aspect 12 of the description is:
The method of any of Aspects 1-7, further comprising flowing a second silicon halide inside of the substrate tube.

Aspect 13 of the description is:
A method of forming an optical fiber preform, comprising:
flowing a silicon halide and $O_2$ inside of a substrate tube, wherein a molar ratio of the silicon halide to $O_2$ is greater than 1.5;
applying energy to form a plasma from the silicon halide and the $O_2$, the plasma heating an inside surface of the substrate tube to a temperature of from about 1000° C. to about 1700° C.; and depositing silica glass from a reaction of the silicon halide and the $O_2$ on the inside surface of the substrate tube, the silica glass comprising a halogen derived from the silicon halide at a concentration of 2.0 wt % or greater.

Aspect 14 of the description is:
The method of Aspect 13, wherein the molar ratio of the silicon halide to $O_2$ is greater than 2.0.

Aspect 15 of the description is:
The method of Aspect 13, wherein the molar ratio of the silicon halide to $O_2$ is greater than 3.0.

Aspect 16 of the description is:
The method of Aspect 13, wherein the molar ratio of the silicon halide to $O_2$ is greater than 4.0.

Aspect 17 of the description is:
The method of Aspect 13, wherein the molar ratio of the silicon halide to $O_2$ is greater than 5.0.

Aspect 18 of the description is:
The method of Aspect 13, wherein a pressure of the silicon halide and the $O_2$ within the substrate tube is less than about 50 Torr or less.

Aspect 19 of the description is:
The method of Aspect 13, wherein a pressure of the silicon halide and the $O_2$ within the substrate tube is less than about 40 Torr or less.

Aspect 20 of the description is:
The method of Aspect 13, wherein a pressure of the silicon halide and the $O_2$ within the substrate tube is less than about 20 Torr or less.

Aspect 21 of the description is:
The method of any of Aspects 13-20, wherein the plasma heats the inside surface of the substrate tube to a temperature of from about 1100° C. to about 1400° C.

Aspect 22 of the description is:
The method of any of Aspects 13-20, wherein the plasma heats the inside surface of the substrate tube to a temperature of from about 1100° C. to about 1300° C.

Aspect 23 of the description is:
The method of any of Aspects 13-20, wherein the plasma heats the inside surface of the substrate tube to a temperature of from about 1100° C. to about 1200° C.

Aspect 24 of the description is:
A method of forming an optical fiber, comprising:
flowing a silicon halide and $O_2$ inside of a substrate tube, wherein a molar ratio of the silicon halide to $O_2$ greater than 1.5, further wherein the partial pressure of the silicon halide and $O_2$ within the substrate tube is about 50 Torr or less;
applying energy to form a plasma from the silicon halide and the $O_2$, the plasma heating an inside surface of the substrate tube to a temperature of from about 1000° C. to about 1400° C.; and
depositing silica glass inside the substrate tube from a reaction of the silicon halide and the $O_2$ on the inside surface of the substrate tube, the silica glass comprising a halogen derived from the silicon halide at a concentration of from about 2.0 wt % to about 7.0 wt %.

Aspect 25 of the description is:
The method of Aspect 24, wherein the silicon halide comprises at least one of $SiCl_4$ and $SiBr_4$.

Aspect 26 of the description is:
The method of either of Aspects 24 and 25, wherein the silica glass is substantially free of $GeO_2$.

Aspect 27 of the description is:
The method of any of Aspects 24-26, wherein the silica glass is substantially void-free.

Aspect 28 of the description is:
The method of any of Aspects 24-27, wherein the silicon halide is in vapor form during the flowing.

Aspect 29 of the description is:
The method of any of Aspects 24-27, further comprising the step of:
drawing the silica glass into the optical fiber.

Aspect 30 of the description is:
The method of Aspect 29, wherein the halogen is Br and wherein a core of the optical fiber comprises about 2.0 wt % or greater of the Br.

Aspect 31 of the description is:
The method of Aspect 29, wherein the halogen is Cl and wherein a core of the optical fiber comprises about 2.0 wt % or greater of the Cl.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise.

What is claimed is:

1. A method of forming an optical fiber preform, comprising:
flowing a silicon halide and an oxidizer inside of a substrate tube at a combined partial pressure of from about 5 Torr to about 45 Torr, wherein the silicon halide comprises $SiCl_4$ and wherein a molar ratio of the silicon halide to the oxidizer is from 1.5 to 4.0;
applying energy to form a plasma from the silicon halide and the oxidizer, the plasma heating an inside surface of the substrate tube to a temperature of from about 1000° C. to about 1700° C.; and
depositing silica glass from a reaction of the silicon halide and the oxidizer on the inside surface of the substrate tube, the silica glass comprising chlorine derived from the silicon halide, wherein the silica glass includes a concentration of the chlorine of about 2 wt % or greater and the silica glass includes a relative refractive index greater than 0.06 Δ% per wt % of the chlorine compared to undoped $SiO_2$.

2. The method of claim 1, wherein the oxidizer comprises $O_2$.

3. The method of claim 1, wherein the concentration of the chlorine is from about 2.0 wt % to about 7.0 wt %.

4. The method of claim 1, wherein the silicon halide further comprises $SiBr_4$.

5. A method of forming an optical fiber preform, comprising:
flowing a silicon halide and $O_2$ inside of a substrate tube at a combined partial pressure of from about 5 Torr to about 45 Torr, wherein the silicon halide comprises $SiCl_4$ and wherein a molar ratio of the silicon halide to $O_2$ is greater than 1.5;
applying energy to form a plasma from the silicon halide and the $O_2$, the plasma heating an inside surface of the substrate tube to a temperature of from about 1000° C. to about 1700° C.; and
depositing silica glass from a reaction of the silicon halide and the $O_2$ on the inside surface of the substrate tube, the silica glass comprising chlorine derived from the silicon halide at a concentration of 2.0 wt % or greater and the silica glass including a relative refractive index greater than 0.06 Δ % per wt % of the chlorine compared to undoped $SiO_2$.

6. The method of claim 5, wherein the molar ratio of the silicon halide to $O_2$ is greater than 3.0.

7. The method of claim 5, wherein the combined partial pressure of the silicon halide and the $O_2$ within the substrate tube is less than about 40 Torr and greater than about 5 Torr.

8. The method of claim 5, wherein the plasma heats the inside surface of the substrate tube to a temperature of from about 1100° C. to about 1400° C.

9. A method of forming an optical fiber; comprising:
flowing a silicon halide and $O_2$ inside of a substrate tube, wherein the silicon halide comprises $SiCl_4$ and wherein a molar ratio of the silicon halide to $O_2$ is greater than 1.5, further wherein a combined partial pressure of the silicon halide and $O_2$ within the substrate tube is from about 5 Torr to about 45 Torr;
applying energy to form a plasma from the silicon halide and the $O_2$, the plasma heating an inside surface of the substrate tube to a temperature of from about 1000° C. to about 1400° C.; and
depositing silica glass inside the substrate tube from a reaction of the silicon halide and the $O_2$ on the inside surface of the substrate tube, the silica glass comprising chlorine derived from the silicon halide at a concentration of from about 2.0 wt % to about 7.0 wt % and the silica glass including a relative refractive index greater than 0.06 Δ% per wt % of the chlorine compared to undoped $SiO_2$.

10. The method of claim 9, wherein the silicon halide further comprises $SiBr_4$.

11. The method of claim 9, wherein the silica glass is substantially free of $GeO_2$.

12. The method of claim 9, wherein the silica glass is substantially void-free.

13. The method of claim 9, wherein the silicon halide is in vapor form during the flowing.

14. The method of claim 9, further comprising the step of:
drawing the silica glass into the optical fiber.

15. The method of claim 14, wherein the silicon halide further comprises $SiBr_4$ and wherein a core of the optical fiber comprises about 2.0 wt % or greater of bromine derived from the silicon halide.

16. The method of claim 14, wherein a core of the optical fiber comprises chlorine at a concentration of from about 2.0 wt % to about 7.0 wt %.

* * * * *